United States Patent [19]

Kobayashi et al.

[11] 4,251,501
[45] Feb. 17, 1981

[54] PROCESS OF PREPARING HIGH PURITY CRYOLITE FROM FLUORIDE SOLUTION CONTAINING DISSOLVED SILICA

[75] Inventors: Yoshiyuki Kobayashi; Tamio Nakamura, both of Ube, Japan

[73] Assignee: Central Glass Company, Limited, Japan

[21] Appl. No.: 64,363

[22] Filed: Aug. 7, 1979

[30] Foreign Application Priority Data

Aug. 8, 1978 [JP] Japan ................... 53-95804
Jun. 29, 1979 [JP] Japan ................... 54-81509

[51] Int. Cl.³ .............................................. C01F 7/50
[52] U.S. Cl. .................................................. 423/465
[58] Field of Search ................ 423/116, 124, 465

[56] References Cited

U.S. PATENT DOCUMENTS

| 1,871,723 | 8/1932 | Morrow | 423/116 |
| 2,994,582 | 8/1961 | Byrns | 423/465 |
| 3,563,699 | 2/1971 | Cuneo | 423/465 |
| 3,816,591 | 6/1974 | Schmidt | 423/465 |
| 4,165,264 | 8/1979 | Satchell | 423/32 |

FOREIGN PATENT DOCUMENTS

| 773279 | 3/1972 | Belgium | 423/465 |
| 53-7158 | 3/1978 | Japan | 423/465 |
| 234675 | 10/1969 | U.S.S.R. | 423/465 |
| 415955 | 3/1979 | U.S.S.R. | 423/465 |

Primary Examiner—Brian E. Hearn
Attorney, Agent, or Firm—Fleit & Jacobson

[57] ABSTRACT

A process of precipitating cryolite from a reaction solution given by mixing a sodium aluminate solution with a fluoride solution containing silica dissolved therein as impurity at reaction temperatures above 60° C. To reduce silica content in the precipitated cryolite, the reaction solution is made to contain carbonate ions, 1–20 g/l as $CO_2$, by introducing either carbon dioxide gas or a soluble carbonate into the fluoride solution Moreover, ignition loss of the cryolite can be decreased by preheating the sodium aluminate solution to 90° C. or above.

16 Claims, 1 Drawing Figure

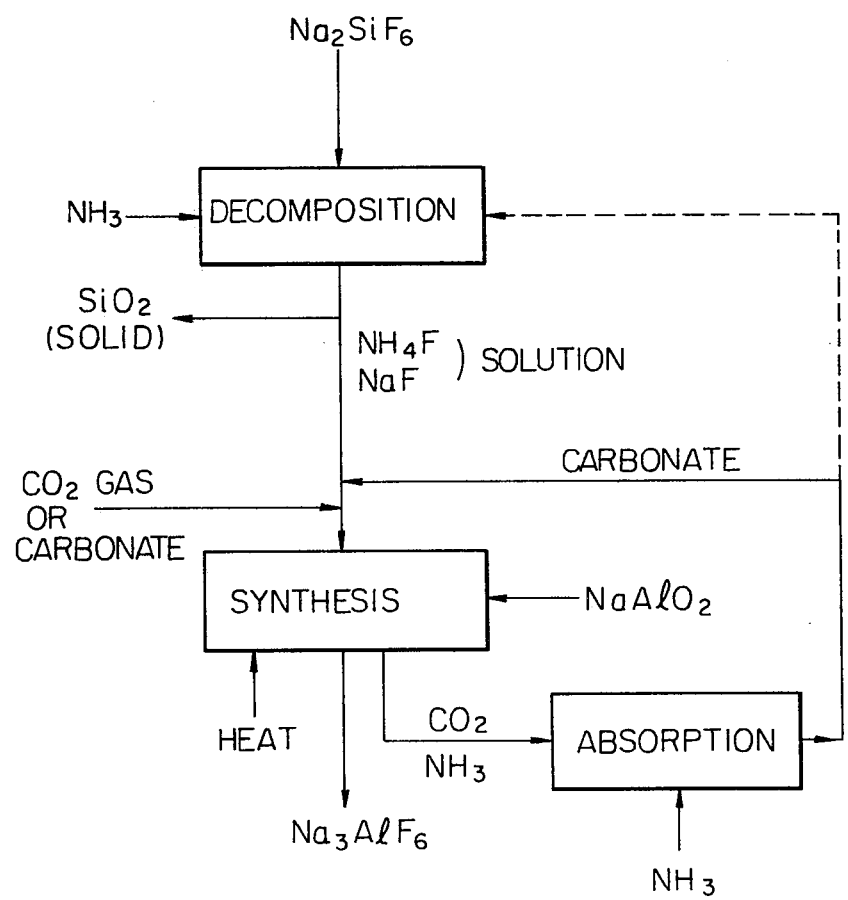

PROCESS OF PREPARING HIGH PURITY CRYOLITE FROM FLUORIDE SOLUTION CONTAINING DISSOLVED SILICA

BACKGROUND OF THE INVENTION

This invention relates to an improvement in a process for the synthesis of cryolite by reaction between sodium aluminate and a fluoride solution which contains silica as an impurity dissolved therein.

Various processes are known for the production of synthetic cryolite which is largely used in the extraction of aluminum metal from alumina by electrolysis. An old practice was the use of high purity fluorite as starting material, but most of the recent processes utilize certain fluorides obtained as by-product in the production of phosphatic materials.

At present, the most prevailing method for industrial synthesis of cryolite is to add sodium aluminate to an aqueous solution of ammonium fluoride and/or sodium fluoride prepared by alkali decomposition of a silicofluoride obtained as by-product of wet process phosphoric acid. The following equations are representative of reactions according to this method. Among these, primary importance and preference have been given to the process represented by Equations (A-1) and (A-2), i.e. the use of a solution of ammonium fluoride and sodium fluoride prepared by ammonia decomposition of sodium hexafluorosilicate (simply called sodium silicofluoride), though the processes represented by Equations (B-1), (B-2); and (C-1), (C-2) are also practicable.

$Na_2SiF_6 + 4NH_3 + 2H_2O \rightarrow 4NH_4F + 2NaF + SiO_2 \downarrow$ (A-1)

$4NH_4 + 2NaF + NaAlO_2 \rightarrow Na_3AlF_6 + 4NH_3 + 2H_2O$ (A-2)

$H_2SiF_6 + 6NH_3 + 2H_2O \rightarrow 6NH_4F + SiO_2 \downarrow$ (B-1)

$6NH_4F + NaAlO_2 + 2NaOH \rightarrow Na_3AlF_6 + 6NH_3 + 4H_2O$ (B-2)

$Na_2SiF_6 + 6NaOH \rightarrow 6NaF + Na_2O \cdot SiO_2 + 3H_2O$ (C-1)

$6NaF + NaAlO_2 + 2H_2O \rightarrow Na_3AlF_6 + 4NaOH$ (C-2)

As represented by Equation (A-1), silica is formed during ammonia decomposition of sodium silicofluoride. Although the precipitated silica can be removed from the fluoride solution, it is inevitable that a certain amount of silica remains dissolved in the fluoride solution. As a matter of inconvenience, most of the silica dissolved in the fluoride solution is liable to shift into the cryolite formed by the reaction of, for example, Equation (A-2). This raises a serious problem since the presence of silica in cryolite used as the bath material in electrolytic extraction of aluminum causes significant lowering of the current efficiency.

Therefore, various methods have been proposed to reduce silica content in synthetic cryolite. For example, Japanese Patent Specification Publication No. 47(1972)-3445 proposes to remove not only phosphorus matter but also silica from an industrially obtained fluoride solution by treatment with a ferric salt, and U.S. Pat. No. 2,916,352 proposes to accomplish a reaction to form cryolite from a fluoride containing phosphoric acid under a strongly acidic condition expressed by pH values below 2.0. However, none of the hitherto proposed methods is fully satisfactory when consideration is given both to the efficiency of reducing silica content in the synthesized cryolite and to the costs of material and operation of the process.

As another problem about the above described process, the synthesized cryolite exhibits an unsatisfactorily large ignition loss. When such a synthetic cryolite is used in an electrolytic bath for the extraction of aluminum, a considerable amount of fluorine is dissipated from the heated cryolite and offers an air pollution problem. Therefore, it is a usual practice to fire the synthesized and dried cryolite at 350°–700° C. before marketing the synthetic cryolite. However, this means the addition of an extra and theoretically unnecessary procedure to the synthesis process and offers a disadvantage that a considerable amount of fluorine is dissipated at this stage. Concerning the reactions represented by the above Equations, Japanese Patent Specification Publication No. 53(1978)-7158 shows reaction conditions favorable to the synthesis of cryolite of small ignition loss. However, it is considered that still there is a much room for improvement on this point.

SUMMARY OF THE INVENTION

It is a primary object of the present invention to provide an improved process for the preparation of cryolite from a fluoride solution containing silica as an impurity dissolved therein, which process gives cryolite of very low silica content and can be practiced easily and economically.

It is another object of the invention to provide an improved process for the preparation of cryolite from the above stated material, which process gives cryolite not only very low in silica content but also very small in ignition loss.

In a process according to the invention, cryolite is precipitated from a reaction solution given by mixing an aqueous solution of sodium aluminate with an aqueous fluoride solution which contains silica as an impurity dissolved therein at a reaction temperature not lower than 60° C., and an essential feature of the invention resides in that the reaction solution is made to contain carbonate ions.

The presence of carbonate ions in the reaction solution is realized by introducing either carbon dioxide gas or a water soluble carbonate such as ammonium carbonate or ammonium hydrogen carbonate into the reaction solution, or more preferably into the fluoride solution before mixing with the sodium aluminate solution. The concentration of carbonate ions in the reaction solution is made to be at least 1 g/l as $CO_2$ and preferably in the range from 1 to 20 g/l as $CO_2$.

The reaction to precipitate cryolite is conducted under known reaction conditions, and the presence of carbonate ions in the reaction solution results in that the precipitated cryolite is remarkably low in silica content and, as an additional advantage, takes the form of desirably large crystal particles such as of 100–300 μm in mean particle size.

Very preferably, the sodium aluminate solution is preheated to a temperature not lower than 90° C., preferably in the range from 90° to 120° C., and then mixed with the fluoride solution which has already been added with carbon dioxide gas or a water soluble carbonate. The preheating of the sodium aluminate solution brings about a remarkable decrease in the ignition loss of the precipitated cryolite with an increase in the fluorine content and with the maintenance of a reduced silica content by the effect of the presence of carbonate ions in the reaction solution.

BRIEF DESCRIPTION OF THE DRAWINGS

The single FIGURE is a flow diagram of a process according to the invention.

DESCRIPTION OF THE PREFERRED EMBODIMENTS

A process according to the invention is particularly suitable to the preparation of cryolite from an aqueous solution of ammonium fluoride and sodium fluoride, which is given by ammonia decomposition of sodium fluorosilicate obtained as a by-product of wet process phosphoric acid and contains silica as an impurity dissolved therein, but this process is practicable and gives a good result also when the starting material is a differently originated aqueous solution of ammonium fluoride and/or sodium fluoride in which is dissolved silica as an impurity.

Now reference will be made to Equations (A-1), (A-2) and the flow diagram in the single FIGURE. As expressed by Equation (A-1), silica is formed when sodium silicofluoride is decomposed in water with ammonia to give a solution of ammonium fluoride and sodium fluoride. Most of the silica precipitates from the solution. Although the precipitated silica assumes a gel-like state and floats about in the fluoride solution, the solution can easily be removed from the precipitated silica by sedimentation and decantation. However, a small amount of silica remains dissolved in the fluoride solution. The point aimed at by the present invention is to minimize incorporation of the dissolved silica into cryolite prepared from this fluoride solution without making any complicated treatment of the solution and without impairing the merits of the known synthesis process represented by Equation (A-2). In a process of the invention, preparation of the fluoride solution is completed by removal of the precipitated silica. Preferably, the mole ratio $NaF/NH_4F$ in the fluoride solution is not greater than 0.8. Usually pH of this fluoride solution is in the range from 8.5 to 9.1, though variable depending on the temperature.

Except that either carbon dioxide gas or a soluble carbonate is used as an additional material, synthesis of cryolite according to the invention is achieved by reaction between the fluoride solution and sodium aluminate in the form of aqueous solution under known conditions. Preferably, the fluoride solution and sodium aluminate solution are mixed in such a proportion that mole ratio $6F/Al$ in the resultant reaction solution is in the range from 1.0 to 1.2, while mole ratio $Na_2O/Al_2O_3$ in the sodium aluminate solution is not lower than a value given by $3-(6AC/A+1)$, where A represents the aforementioned mole ratio $NaF/NH_4F$, and C represents the aforementioned mole ratio $6F/Al$. In other words, it is preferable that the mole ratio $Na_2O/Al_2O_3$ is not lower than about 1.1 and, further preferably, is not greater than about 1.3. Also preferably, the fluoride solution and sodium aluminate solution are mixed such that the pH of the resultant reaction solution is in the range of 3-11, and the reaction is accomplished at temperatures in the range from 60° C. to 100° C., and more preferably in the range from 80° C. to 100° C. These preferable reaction conditions are not different from those disclosed in Japanese Patent Specification Publication No. 53(1978)-7158. That the mole ratio $6F/Al$ in the reaction solution is at least 1.0 means the existence of more than the theoretical amount of F, which is favorable to the suppression of the formation of chiolite $5NaF \cdot 3AlF_3$. The use of sodium aluminate of which $Na_2O/Al_2O_3$ mole ratio is above 1.0 ensures complete dissolution of the aluminate in water, but it is not desirable that this mole ratio becomes above about 1.3 because of the possibility of formation of increasing amounts of hardly soluble sodium- and aluminum-containing compounds other than cryolite during reaction of the aluminate solution with the fluoride solution. The reaction solution is made to have pH values in the range of 3-11 because chiolite is liable to be formed as the pH becomes 2 or below but, on the other hand, the reaction at a pH value of 12 or above is liable to give thermally unstable cryolite and suffers a decrease in the yield due to a considerable increase in the solubility of cryolite. The reaction temperature is required to be not lower than 60° C. in order to prevent precipitation of fine crystals of cryolite and minimize the silica content in the precipitated cryolite. Although relatively high reaction temperatures are preferable, an upper limit is set at 100° C. in view of practical problems such as corrosion of the apparatus.

In the present invention, it is permissible that both the fluoride solution and sodium aluminate solution have temperatures below 60° C. insofar as the mixture of the two solutions is heated rapidly to a desired reaction temperature. However, it is far more preferable to prepare the reaction solution by mixing a sodium aluminate solution preheated to a temperature not lower than 90° C. with the fluoride solution which has already been added with either carbon dioxide gas or a water soluble carbonate but has not been preheated, and then heating the mixed solution to a desired reaction temperature. (Heating of the mixed solution is necessary even though the sodium aluminate solution has been preheated because usually the sodium aluminate solution is far smaller in volume than the fluoride solution.) More detailed description of preheating of the sodium aluminate solution will be given later.

Besides the above described reaction conditions, preferably the fluoride solution and sodium aluminate solution are mixed such that the concentration of F in supernatant liquor of the reaction system at the end of the reaction is in the range of 2-2 g/l, and more preferably in the range of 3.5-3.8 g/l, to obtain cryolite of low silica content.

The presence of carbonate ions in the reaction solution as the essential feature of a process according to the invention is realized by the introduction of either carbon dioxide gas or a water soluble carbonate into the reaction solution. If desired, carbon dioxide gas and a soluble carbonate may be used jointly. The carbonate may be selected from ammonium carbonate, ammonium hydrogen carbonate, sodium carbonate and sodium hydrogen carbonate, and it is possible to use two or more kinds of such carbonates jointly. In practice, it is suitable to blow carbon dioxide gas into the fluoride solution, or add a selected carbonate to the fluoride solution, before the addition of the sodium aluminate solution to the fluoride solution because the reaction solution given by the addition of the sodium aluminate solution is soon subjected to heating and, as a more decisive reason, the sodium aluminate solution is usually preheated as mentioned above.

The blowing of carbon dioxide gas into the fluoride solution is performed such that the concentration of carbonate ions in the reaction solution resulting from the addition of sodium aluminate solution becomes at least 1 g/l as $CO_2$. When only a smaller amount of carbonate ions are present in the reaction solution immediately after preparation, reduction of silica content in the synthesized cryolite by the effect of carbonate ions remains at a still insufficient level. However, the presence of more than 30 g/l of carbonate ions (as $CO_2$) in the reaction solution brings about little enhancement of the effect and accordingly is uneconomical. Furthermore, the presence of excessive amount of carbonate ions in the reaction solution tends to cause formation of hardly soluble complex carbonates typified by dawsonite $NaAlO(OH)HCO_3$ as impurities incorporated in the precipitated cryolite. Therefore, it is preferable that the reaction solution contains 1–20 g/l of carbonate ions calculated as $CO_2$. (When expressed by volume ratio of $CO_2$ gas to the reaction solution, a range from about 0.5 to about 10 corresponds to the range of 1–20 grams of $CO_2$ per liter of the reaction solution.) Then it becomes possible to obtain cryolite very low in silica content and fairly large in particle size by conducting the reaction of Equation (A-2) under the above described reaction conditions. In the case of a soluble carbonate, the carbonate is added in such an amount that the concentration of carbonate ions in the reaction solution resulting from decomposition of the carbonate becomes at least 1 g/l, and preferably in the range of 1–20 g/l, calculated as $CO_2$.

Among the aforementioned carbonates, the use of ammonium carbonate and/or ammonium hydrogen carbonate is particularly preferable. In aqueous solution, these carbonates readily undergo decomposition according to the following equations when heated to about 70° C.

$(NH_4)_2CO_3 \rightarrow 2NH_3 + CO_2 + H_2O$

$NH_4HCO_3 \rightarrow NH_3 + CO_2 + H_2O$

Accordingly the reaction temperature in a process of the invention is made above 70° C. when such carbonate is used as the source of carbonate ions. A reason for the preferableness of ammonium carbonate and ammonium hydrogen carbonate is the possibility of recycling the carbonate with little loss. As shown in the flow diagram, both carbon dioxide gas and ammonia formed by decomposition of ammonium carbonate or ammonium hydrogen carbonate are recovered and supplied to an absorption apparatus, where carbon dioxide gas is fixed with ammonia. Also, ammonia formed by the reaction of Equation (A-1) can be used for this purpose, and a certain amount of ammonia may externally be supplied to the absorption apparatus. The recovered ammonium carbonate or ammonium hydrogen carbonate is recycled from the absorber to the fluoride solution preparation stage. It is permissible to recycle the recovered carbonate to the stage of ammonia decomposition of sodium fluorosilicate because the carbonate does not decompose during ammonia decomposition of sodium fluorosilicate (performed at 30°–50° C.) but decomposes when the obtained fluoride solution is heated after the addition of sodium aluminate solution thereto. Recovery of carbon dioxide is possible also when carbon dioxide gas is used as the source of carbonate ions by utilizing ammonia formed by the reaction of (A-2) and externally supplying a small amount of ammonia to the absorption apparatus. Thus, a process of the invention can be continued with replenishment of only a very small amount of ammonium carbonate or ammonium hydrogen carbonate, or carbon dioxide gas. This means that cryolite of improved quality can be synthesized by a process of the invention with only a trifling increase in the production cost.

The present invention recommends to provide the reaction solution for the synthesis of cryolite by introducing a sodium aluminate solution preheated to a temperature not lower than 90° C. into the fluoride solution which has already been added with carbon dioxide gas or a soluble carbonate. Such preheating of the sodium aluminate solution brings about a remarkable decrease in the ignition loss of cryolite precipitated from the reaction solution under the hereinbefore described reaction conditions.

A main reason for a relatively large value of ignition loss of cryolite synthesized by a conventional process represented by Equations (A-1) and (A-2) is considered to be the formation of hardly soluble aluminum-containing compounds such as $Na_3AlF_6 \cdot xH_2O$, $Na_3[Al(F,OH)_6]$ and/or $Na_3[Al(F, OH)_6] \cdot xH_2O$ which are incorporated into the precipitated cryolite as impurities. Surprisingly, we have found and confirmed that the formation of these impurity compounds can effectively be suppressed simply by preheating the sodium aluminate solution before its contact with the fluoride solution. A decrease in the ignition loss of the synthesized cryolite by this technique is accompanied by a rise in the purity of the cryolite expressed by the F content. The silica-decreasing effect of the presence of carbonate ions in the reaction solution can be fully gained even when preheating of the sodium aluminate solution is effected. Far from that, preheating of the sodium aluminate solution in combination with the addition of carbon dioxide or a soluble carbonate to the fluoride solution is quite favorable because the preheating is effective also for suppression of the formation of complex carbonates such as dawsonite and the like which are liable to precipitate together with cryolite from the reaction solution containing a relatively large amount of carbonate ions.

Preferably sodium aluminate solution is preheated to a temperature in the range from 90° C. to 120° C. just before mixing of this solution with the fluoride solution (to avoid cooling of the preheated aluminate solution). It is permissible that the reaction temperature is lower than the temperature of the preheated sodium aluminate solution, but it is desirable to employ a relatively high reaction temperature such as about 90° C.

The preheating of sodium aluminate solution may be accomplished by any heating method. For example, a sodium aluminate solution to be supplied to the reaction vessel may be maintained in a separate vessel provided with a heating means or may be passed through a passage provided with coiled heating pipe in which flows a heating medium such as steam. However, we have experimentally confirmed that best results can be obtained when preheating of the sodium aluminate solution is accomplished by direct contact of the solution with pressurized steam. As a probable reason for advantageousness of such a direct heating method over simple indirect heating methods, the entire solution can be heated very uniformly by the direct heating method.

The following examples are illustrative of the present invention.

EXAMPLE 1

The decomposition of sodium silicofluoride in water with ammonia and removal of precipitated silica gave a fluoride solution (NaF 27.39 g/l, $NH_4F$ 38.25 g/l, total F 32.03 g/l, mole ratio NaF/NH₄F 0.63, SiO₂ 0.46 g/l, pH 8.9). One liter of this fluoride solution was heated to 90° C. in a 3-liter beaker equipped with a stirrer, and either ammonium carbonate or ammonium hydrogen carbonate was added, with continued stirring, in a variable amount as shown in the following Table 1. Then added was 50 g of a sodium aluminate solution ($Al_2O_3$ 385 g/l, mole ratio $Na_2O/Al_2O_3$ 1.20) maintained at about 50° C., and the reaction system was continuously stirred at about 90° C. for 1 hr thereafter. At the end of the reaction, the concentration of F in supernatant liquor of the reaction system was 3.45–3.60 g/l. The precipitated cryolite was separated from the mother liquor by decantation and washed with water. After drying, the cryolite weighed 52.5 g. Analysis of the thus obtained cryolite showed that the addition of the carbonate to the reaction system, i.e. the presence of carbonate ions in the reaction system, brought about a considerable reduction of the silica content in the synthesized cryolite as can be seen in Table 1.

TABLE I

| Run No. | Carbonate | Quantity of carbonate (g) | Amount of $CO_2$ evolved by carbonate (calculated, gram per liter of reaction solution) | $SiO_2$ in cryolite (Wt. %) |
|---|---|---|---|---|
| Ref. | none | 0 | 0 | 0.57 |
| 1 | ammonium carbonate | 3 | 1.4 | 0.35 |
| 2 | ammonium carbonate | 4 | 1.8 | 0.25 |
| 3 | ammonium carbonate | 5 | 2.3 | 0.19 |
| 4 | ammonium carbonate | 15 | 6.9 | 0.18 |
| 5 | ammonium carbonate | 50 | 23 | 0.17 |
| 6 | ammonium carbonate | 75 | 34 | 0.30 |
| 7 | ammonium carbonate | 100 | 46 | 0.29 |
| 8 | ammonium carbonate | 150 | 69 | 0.27 |
| 9 | ammonium hydrogen carbonate | 3 | 1.7 | 0.30 |
| 10 | ammonium hydrogen carbonate | 12 | 6.7 | 0.19 |

EXAMPLE 2

In the same apparatus as in Example 1, one liter of the fluoride solution described in Example 1 was maintained at about 25° C. Continuously stirring the fluoride solution, carbon dioxide gas was blown into the solution at a rate of 3 liters per minute for a variable period of time. Then 50 g of the sodium aluminate solution used in Example 1 was added to the fluoride solution, while the beaker was heated to maintain a reaction temperature of about 90° C. The reaction was completed by continuing stirring for 30 min after the addition of the sodium aluminate solution. At the end of the reaction, F concentration in supernatant liquor of the reaction system was 3.50–3.55 g/l. The precipitated cryolite was separated from the mother liquor by decantation, washed with water and dried. The weight of the product was 52.5 g, and the silica content in the product was very low as shown in Table 2.

TABLE 2

| Run No. | Duration of $CO_2$ gas blowing (min) | Amount of $CO_2$ gas (gram per liter of reaction solution) | $SiO_2$ in cryolite (wt %) |
|---|---|---|---|
| Ref. | 0 | 0 | 0.63 |
| 1 | 0.33 | 1.8 | 0.35 |
| 2 | 0.5 | 2.7 | 0.25 |
| 3 | 1 | 5.4 | 0.20 |
| 4 | 3 | 16.2 | 0.17 |
| 5 | 5 | 27 | 0.19 |
| 6 | 15 | 81 | 0.18 |
| 7 | 30 | 162 | 0.9 |

EXAMPLE 3

This example illustrates a continuous process. Use was made of a reaction vessel which had an effective capacity of 13.4 liters and was provided with a mechanical stirrer, thermometer and steam jacket. Continuously operating the stirrer and heating the vessel to maintain a reaction temperature of 90° C., the fluoride solution and the sodium aluminate solution employed in Example 1 were continuously introduced into the reaction vessel at 16 l/hr and 800 g/hr, respectively. While the fluoride solution was flowing in an unheated state towards the reaction vessel, carbon dioxide gas was blown continuously into this solution at a rate of 120 l/hr. The sodium aluminate solution flowing into the reaction vessel had a temperature of about 50° C. This experiment was continued for 6 hr. The concentration of F in supernatant liquor flowed out of the reaction vessel was 3.3–3.5 g/l. After the lapse of 2 hr, 4 hr and 6 hr from the start of the experiment, samples of precipitated cryolite were separated from the mother liquor by filtration, washed with water and subjected to analysis. As a reference, a similar experiment was conducted by omitting the blowing of $CO_2$ gas into the reaction system. Table 3 presents the results of these experiments.

TABLE 3

| Lapse of time before sampling (hr) | Amount of $CO_2$ gas (gram per liter of reaction solution) | Cryolite | |
|---|---|---|---|
| | | $SiO_2$ (Wt %) | Mean particle size (μm) |
| 2 (Ref.) | 0 | 0.56 | 50 |
| 2 (Ex. 3) | 12.9 | 0.20 | 250 |
| 4 (Ref.) | 0 | 0.55 | 50 |
| 4 (Ex. 3) | 12.9 | 0.18 | 250 |
| 6 (Ref.) | 0 | 0.55 | 50 |
| 6 (Ex. 3) | 12.9 | 0.18 | 280 |

EXAMPLE 4

The process of this example was fundamentally similar to the continuous process of Example 3, but as a significant modification sodium aluminate solution was introduced into the reaction vessel at a considerably higher temperature.

The fluoride solution employed in Example 3 was continuously introduced into the reaction vessel used in Example 3 at a rate of 18.3 l/hr, and while the fluoride solution was flowing towards the reaction vessel carbon dioxide gas was blown into this solution at a rate of either 142 l/hr or 175 l/hr. A sodium aluminate solution (aluminum content as $Al_2O_3$ 380 g/l, mole ratio $Na_2O/Al_2O_3$ 1.20) was preheated to a temperature within the range of 86°–97° C. as shown in Table 4 and at this temperature was continuously introduced into the reaction vessel at a rate of 0.62 l/hr simultaneously with the introduction of the fluoride solution (so that mole ratio 6F/Al was 1.11). The reaction vessel was kept heated to maintain a reaction temperature of 90° C. This experiment was continued for 5 hr, keeping the stirrer in operation.

In Run Nos. 1–4 in this example, the preheating of the sodium aluminate solution was accomplished by an indirect heating method using a heater having a coiled steam pipe. In Run Nos. 5 and 6, the preheating was accomplished by allowing the sodium aluminate solution to directly contact with pressurized (1.1 kg/cm$^2$) steam. In the direct heating method it was convenient, though not limitative, to utilize a heating vessel disclosed in U.S. Pat. No. 4,044,105, wherein the solution was made to flow as a thin layer on the external surface of a downwardly diverging conical member and the steam was blown against the thin layer of the solution from a plurality of nozzles arranged to surround the conical member.

After completion of the 5-hr operation, precipitated cryolite was separated from the mother liquor by filtration, washed with water (using 500 g of water per kilogram of cryolite) and dried for 1 hr at 105° C. Table 4 shows process conditions made variable in this experiment and analytical values of the obtained cryolite samples.

TABLE 4

| No. | Temp. of aluminate solution (°C.) | Rate of CO$_2$ gas blowing (l/hr) | Amount of CO$_2$ gas (gram per liter of reaction solution) | Analysis of cryolite (dry basis, Wt %) | | |
|---|---|---|---|---|---|---|
| | | | | SiO$_2$ | (theoretical: 54.296) F | ignition loss (500° C. 1 hr) |
| 1 | 94 (indirect heating) | 142 | 15 (7.5)$^{(a)}$ | 0.25 | 52.75 | 0.80 |
| 2 | 94 (indirect heating | 175 | 18 (9.2)$^{(b)}$ | 0.23 | 52.35 | 0.90 |
| 3 | 86 (indirect heating | 142 | 15 | 0.28 | 52.35 | 0.90 |
| 4 | 86 (indirect heating | 175 | 18 | 0.27 | 52.28 | 0.99 |
| 5 | 97 (direct heating | 142 | 15 | 0.22 | 53.83 | 0.27 |
| 6 | 97 (direct heating | 175 | 18 | 0.20 | 53.70 | 0.29 |

$^{(a)}$in parenthesis, calculated volume ratio of CO$_2$ gas to the reaction solution.

EXAMPLE 5

The continuous process of Example 4 was repeated except that either ammonium carbonate or ammonium hydrogen carbonate was added to the fluoride solution in place of carbon dioxide gas employed in Example 4, that the reaction system was maintained at 95° C. and that the operation was continued only for 3 hr.

Table 5 shows process conditions made variable in Example 5 and analytical values of the obtained cryolite samples.

TABLE 5

| Run No. | Temp. of aluminate solution (°C.) | Carbonate (gram per liter of reaction solution) | Amount of CO$_2$ evolved by carbonate (calcd., gram per liter of reaction solution) | Analysis of croylite (dry basis, Wt %) | | |
|---|---|---|---|---|---|---|
| | | | | SiO$_2$ | F | ignition loss (500° C., 1 hr) |
| 1 | 70 (indirect) heating) | (NH$_4$)$_2$CO$_3$ 10 | 4.6 (2.3)$^{(a)}$ | 0.29 | 52.50 | 0.89 |
| 2 | 96 (indirect) | (NH$_4$)$_2$CO$_3$ 10 | 4.6 | 0.28 | 52.60 | 0.80 |
| 3 | 96 (indirect) | (NH$_4$)$_2$CO$_3$ 50 | 23 (11.7)$^{(a)}$ | 0.27 | 52.60 | 0.87 |
| 4 | 97 (direct heating) | (NH$_4$)$_2$CO$_3$ 10 | 4.6 | 0.24 | 53.72 | 0.30 |
| 5 | 97 (direct) | (NH$_4$)$_2$CO$_3$ 50 | 23 | 0.23 | 53.64 | 0.32 |
| 6 | 70 (indirect) | NH$_4$HCO$_3$ 10 | 5.6 (2.8)$^{(a)}$ | 0.28 | 52.43 | 0.89 |
| 7 | 96 (indirect) | NH$_4$HCO$_3$ 10 | 5.6 | 0.27 | 52.50 | 0.81 |
| 8 | 96 (indirect) | NH$_4$HCO$_3$ 50 | 28 (14.2)$^{(a)}$ | 0.27 | 52.48 | 0.87 |
| 9 | 97 (direct) | NH$_4$HCO$_3$ 10 | 5.6 | 0.24 | 53.83 | 0.25 |
| 10 | 97 (direct) | NH$_4$HCO$_3$ 50 | 28 | 0.22 | 53.79 | 0.27 |

$^{(a)}$in parenthesis, calculated volume ratio of CO$_2$ gas to the reaction solution.

EXAMPLE 6

The starting material in this example was an aqueous ammonium fluoride solution (NH$_4$F 62.32 g/l, mole ratio NaF/NH$_4$F O, total F 32.00 g/l, SiO$_2$ 0.48 g/l, pH 9.2) obtained by ammonia treatment of a hydrofluoric acid solution resulting from absorption of hydrogen fluoride, which was obtained as by-product in the production of superphosphate, in water. Either carbon dioxide gas or ammonium hydrogen carbonate was added to this fluoride solution as shown in Table 6, and then the solution was continuously introduced into the reaction vessel used in Examples 3–5 at a rate of 18.0 l/hr. A sodium aluminate solution (aluminum content as Al$_2$O$_3$ 380 g/l, mole ratio Na$_2$O/Al$_2$O$_3$ 3.10) was preheated to a desired temperature as shown in Table 6 either by indirect heating by means of steam pipe or by direct contact with steam, and at this temperature was continuously introduced into the reaction vessel at a rate of 0.62 l/hr simultaneously with the fluoride solution (so that mole ratio 6F/Al was 1.09). the reaction vessel was kept heated to maintain a reaction temperature of 80° C. Each run was continued for 5 hr, keeping the stirrer in operation. The precipitated cryolite was filtered off, washed with water and dried for 1 hr at 105° C. Results of analysis are shown in Table 6.

TABLE 6

| Run No. | Temp. of aluminate solution (°C.) | CO$_2$ gas or carbonate | Amount of CO$_2$ (gram per liter of reaction solution) | Analysis of cryolite (dry basis, Wt %) | | |
|---|---|---|---|---|---|---|
| | | | | SiO$_2$ | F | ignition loss (500° C., 1 hr) |
| 1 | 80 (indirect heating) | NH$_4$HCO$_3$ 10 g/l | 5.6 (2.8)$^{(a)}$ | 0.30 | 52.10 | 1.05 |
| 2 | 100 (indirect) | NH$_4$HCO$_3$ | 5.6 | 0.29 | 52.59 | 0.78 |

TABLE 6-continued

| Run No. | Temp. of aluminate solution (°C.) | $CO_2$ gas or carbonate | Amount of $CO_2$ (gram per liter of reaction solution) | Analysis of cryolite (dry basis, Wt %) | | ignition loss (500° C., 1 hr) |
|---|---|---|---|---|---|---|
| | | | | $SiO_2$ | F | |
| 3 | 100 (indirect) | $NH_4HCO_3$ 10 g/l 50 g/l | 28 (14.2) [a] | 0.28 | 52.35 | 0.80 |
| 4 | 97 (direct heating) | $CO_2$ gas 140 l/hr | 15 (7.8) [a] | 0.20 | 53.87 | 0.25 |
| 5 | 97 (direct) | $NH_4HCO_3$ 10 g/l | 5.6 | 0.23 | 53.70 | 0.27 |

[a] in parenthesis, calculated volume ratio of $CO_2$ gas to the reaction solution.

EXAMPLE 7

The decomposition of sodium silicofluoride recovered from a wet process phosphoric acid plant with sodium hydroxide, followed by removal of precipitated silica, gave an aqueous sodium fluoride solution (NaF 25 g/l, $NH_4F$ zero, total F 11.3 g/l, $SiO_2$ 0.51 g/l, pH 9.2). Either carbon dioxide gas or a selected carbonate was added to this fluoride solution as shown in Table 7, and then the solution was continuously introduced into the reaction vessel used in Examples 3–6 at a rate of 18.3 l/hr. A sodium aluminate solution (aluminum content as $Al_2O_3$ 380 g/l, mole ratio $Na_2O/Al_2O_3$ 1.20) was preheated to a desired temperature as shown in Table 7, either indirectly or directly (by contact with steam), and at this temperature was continuously introduced into the reaction vessel at a rate of 0.22 l/hr simultaneously with the fluoride solution (so that mole ratio 6F/Al was 1.11). A reaction temperature of 95° C. was maintained in the reaction vessel, and each run was continued for 3 hr. The precipitated cryolite was filtered off, washed with water, dried at 105° C. for 1 hr and subjected to analysis. The results are presented in Table 7.

TABLE 7

| Run No. | Temp. of aluminate solution (° C.) | $CO_2$ gas or carbonate | Amount of $CO_2$ (gram per liter of reaction solution) | Analysis of cryolite (dry basis, Wt %) | | ignition loss (500° C., 1 hr) |
|---|---|---|---|---|---|---|
| | | | | $SiO_2$ | F | |
| 1 | 85 (indirect heating) | $CO_2$ gas 150 l/hr | 16 (8.2)[a] | 0.26 | 48.53 | 3.10 |
| 2 | 98 (indirect) | $CO_2$ gas 150 l/hr | 16 | 0.27 | 50.42 | 2.50 |
| 3 | 98 (indirect) | $NH_4HCO_3$ 10 g/l | 5.6 (2.8)[a] | 0.26 | 51.05 | 2.59 |
| 4 | 98 (indirect) | $NH_4HCO_3$ 50 g/l | 28 (14.1)[a] | 0.26 | 50.12 | 2.90 |
| 5 | 98 (indirect) | $NaHCO_3$ 10 g/l | 5.2 (2.7)[a] | 0.25 | 51.00 | 2.55 |
| 6 | 98 (indirect) | $(NH_4)_2CO_3$ 10 g/l | 4.6 (2.3)[a] | 0.26 | 51.20 | 2.53 |
| 7 | 97 (direct heating) | $CO_2$ gas 150 l/hr | 16 | 0.20 | 53.15 | 0.69 |
| 8 | 97 (direct) | NaHCO 10 g/l | 5.2 | 0.22 | 53.10 | 0.73 |
| 9 | 97 (direct) | $CO_2$ gas 250 l/hr | 27 (13.7)[a] | 0.19 | 52.60 | 0.90 |

[a] in parenthesis, volume ratio of $CO_2$ gas to the reaction solution.

What is claimed is:

1. In a process of preparing cryolite by mixing an aqueous solution of sodium aluminate with an aqueous fluoride solution which contains silica dissolved therein as impurity and maintaining a resultant reaction solution at temperatures not lower than 60° C. to allow precipitation of cryolite from the reaction solution,
the improvement comprising said reaction solution being made to contain carbonate ions in a concentration in the range from 1 to 20 g/l as $CO_2$.

2. A process according to claim 1, wherein said reaction solution is made to contain carbonate ions by introducing carbon dioxide gas into said reaction solution.

3. A process according to claim 2, wherein said carbon dioxide gas is introduced into said reaction solution by blowing said carbon dioxide gas into said fluoride solution.

4. A process according to claim 1, wherein said reaction solution is made to contain carbonate ions by introducing at least one water soluble carbonate into said reaction solution.

5. A process according to claim 4, wherein said at least one carbonate is introduced into said reaction solution by adding said at least one carbonate to said fluoride solution.

6. A process according to claim 4, wherein said at least one water soluble carbonate is selected from the group consisting of ammonium carbonate, ammonium hydrogen carbonate, sodium carbonate and sodium hydrogen carbonate.

7. A process according to claim 1, further comprising the step of recovering said carbonate ions by making carbon dioxide gas evolved from said reaction solution react with ammonia.

8. A process according to claim 1, wherein said fluoride solution is an aqueous solution of at least one of sodium fluoride and ammonium fluoride.

9. A process according to claim 8, wherein said fluoride solution is prepared by decomposing sodium hexafluorosilicate in water with ammonia and removing solid silica from the product of the decomposition.

10. A process according to claim 8, wherein mole ratio $NaF/NH_4F$ in said fluoride solution is not greater than 0.8, said fluoride solution being mixed with said sodium aluminate solution at such a mixing ratio that mole ratio 6F/Al in said reaction solution is in the range from 1.0 to 1.2, mole ratio $Na_2O/Al_2O_3$ in said sodium aluminate solution being not lower than a value given by $3-(6AC/A+1)$, where A represents said mole ratio $NaF/NH_4F$, and C represents said mole ratio 6F/Al.

11. A process according to claim 8, wherein pH of said reaction solution is in the range from 3 to 11.

12. A process according to claim 8, wherein said reaction solution is maintained at temperatures in the range from about 80° C. to about 100° C.

13. A process according to claim 1, wherein said sodium aluminate solution is preheated to a temperature not lower than 90° C. and added to said fluoride solution in the preheated state.

14. A process according to claim 13, wherein said sodium aluminate solution is preheated to a temperature in the range from 90° C. to 120° C.

15. A process according to claim 14, wherein said reaction solution is maintained at temperatures in the range from about 80° C. to about 100° C.

16. A process according to claim 14, wherein said sodium aluminate solution is preheated by direct contact of said sodium aluminate solution with pressurized steam.

* * * * *